No. 657,229. Patented Sept. 4, 1900.
S. M. WARDER.
AUTOMATIC ADJUSTMENT FOR HARVESTER REELS.
(Application filed Jan. 29, 1900.)

(No Model.)

Witnesses: Inventor, Shadrach M. Warder

UNITED STATES PATENT OFFICE.

SHADRACH M. WARDER, OF WINTERS, CALIFORNIA.

AUTOMATIC ADJUSTMENT FOR HARVESTER-REELS.

SPECIFICATION forming part of Letters Patent No. 657,229, dated September 4, 1900.

Application filed January 29, 1900. Serial No. 3,164. (No model.)

*To all whom it may concern:*

Be it known that I, SHADRACH M. WARDER, a citizen of the United States, residing at Winters, county of Yolo, State of California, have invented an Improvement in Automatic Adjustments for Harvester-Reels; and I hereby declare the following to be a full, clear, and exact description of the same.

My invention relates to a means for adjusting the reels of harvesters, headers, and like apparatus so that the reel will always be in the proper position to sweep the grain toward the sickle whether the straw be short or long.

It consists of the parts and the constructions and combinations of parts hereinafter described and claimed.

Figure 1:
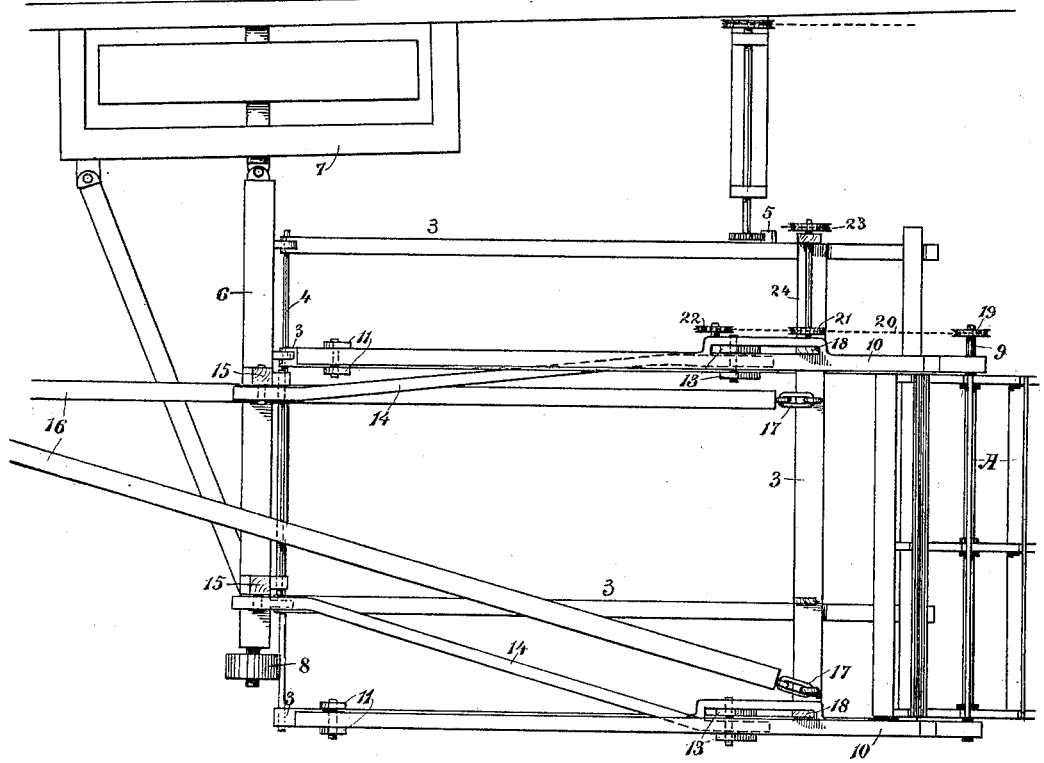
Figure 2:
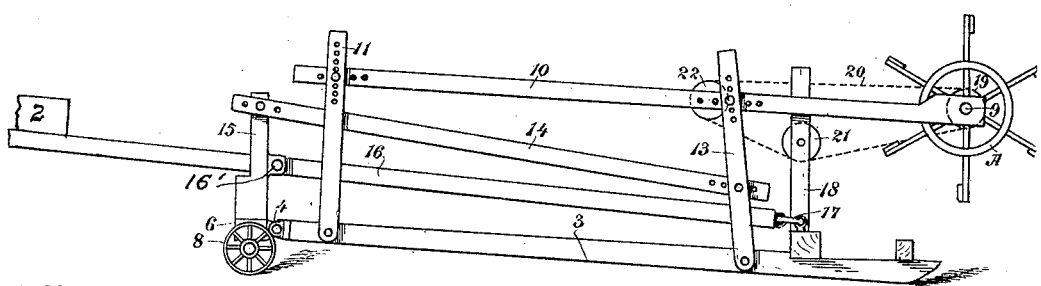

Referring to the accompanying drawings, Figure 1 is a plan view of the header and connections. Fig. 2 is a side elevation of the same.

The header portion of a harvester apparatus comprises a framework having a sickle which reciprocates across the front and is adapted to cut the grain while the machine is moved over the field. Grain thus cut falls upon a traveling belt or "draper," so called, which conveys it to the threshing machinery.

In order to bring the straw properly to the sickle, a reel A is employed, this reel being revolved by suitable connection with some driving portion of the machinery. These reels are usually fixed, or if adjustable the adjustment is made by stopping the machine and raising or lowering the reel. If the straw is all long or all short, it will be manifest that such an adjustment could be satisfactorily made; but this is not the case, as the straw varies in length in different parts of the field. If the reel is set in the proper position to sweep the long straw in so that it will be cut to the best advantage, it will be so high that it will not touch the shorter straw, and if set low enough to catch this shorter straw it is entirely out of position for longer straw.

It is the object of my invention to so connect the reel with the header-frame that when the latter is raised for high grain or depressed to cut low or short grain the reel will be automatically adjusted to its proper position for any class of grain from the shortest to the longest by its connection with and movement from the header-frame.

Header-frames are connected in various ways with the threshing-machine frame and all have a counterbalance-weight 2 by which that portion of the header-frame 3 which is in front of the hinge points or supports 4 is properly counterbalanced. The raising and lowering of the header-frame is effected sometimes by a suitably-fulcrumed lever extending from the rear portion of the housing of the threshing-machine diagonally forward and connected by a link with the front part of the header-frame and in rear of the draper. In other cases a rack-bar at 5 connects with the front inner angle of the header-frame and the rack is engaged by a pinion upon a shaft suitably journaled upon the forward part of the threshing-machine frame and turnable by a hand-wheel or otherwise. In place of the bar a chain may be employed which winds upon a drum journaled upon the threshing-machine frame, with a suitable hand-wheel for raising and lowering. These devices form no part of my invention and are only mentioned to illustrate methods for raising and lowering the header-frame.

In the present case I have illustrated the header-frame 3 as being hinged at 4 to a beam 6, which projects outwardly at right angles from the outer timber 7 of the threshing-machine frame. This timber is approximately in line with the bearing and driving wheel of the threshing-machine upon that side and which is commonly known as the "grain-wheel." At the outer end of this timber is a supporting-wheel, known as the "header-wheel" 8, which supports and carries this portion of the header. I do not confine myself to this particular method of constructing the header and its connections. It is only illustrated for the purpose of explaining the operation of my own invention.

In my invention the reel A has its shaft 9 journaled at the front end of the timbers 10. The rear ends of these timbers are fulcrumed to upright links 11, the lower ends of which are similarly fulcrumed upon the rear ends of the longitudinal header-frame timbers 3, as shown. Intermediate between these fulcrum-points and the reel in front are other links 13, the lower ends of which are also fulcrumed to the longitudinal frame-timbers 3 of the header and the upper ends are pivoted to the reel-carrying timbers 10. The pivotal points of the timbers 10 to the links 11 and 13 are vertically adjustable by means of holes made in the upright links, and the reel-frame is adjustable forward or back by similar holes made transversely through the timbers 10, so that by means of the pivot-pins any permanent adjustment of the reel may be made with relation to the header-frame. This adjustment is such that the reel when at its lowest point will just swing clear of the sickle-bar and will be in such position vertically with relation to it that it will sweep the shortest grain inwardly, so that it will be cut and carried backwardly upon the draper. This insures the saving of a very large quantity of grain which would otherwise be lost; but with the reel in this position if longer straw is encountered the reel is too low and too far back to properly sweep this long straw backwardly to the sickle and draper-belt. On the contrary, it will beat it down forwardly and cause a great loss in this manner. It is therefore necessary in raising the reel from its lowest position to also throw it forward to a position in advance of the sickle, so that when it encounters the long grain it will bring it back properly to the sickle. For this purpose I have shown the actuating arms, rods, or bars 14, the rear ends of which are here shown as fulcrumed upon standards 15, mounted upon the outwardly-projecting wheel-frame 6. It will be manifest that they may be connected with any suitable stationary part of the frame which different constructions of headers would make available. The front ends of these bars are pivoted to the links 13 at ponts considerably below the connections of these links with the side bars or timbers 10 of the reel-frame, so that they incline downwardly from their rear point of attachment to the point where they connect with the links 13.

The counterbalance-beam 16 is fulcrumed at 16' upon the upright timbers 15, and its front end is flexibly connected with the transverse bar upon the header-frame, as shown at 17.

In order to properly guide the reel-frame bars 10 and prevent the reel from shifting from side to side, I have shown vertically-fixed guide-timbers 18 extending upwardly from the forward part of the header-frame and passing through slots or channels made through or formed with the bars 10, these slots being long enough to allow of the forward and back movement of the bars 10 as the header-frame is raised and depressed.

The operation will then be as follows: The header-frame being at its lowest point to cut low grain, the reel will also be depressed by reason of the position of the supporting-links 11 and 13 and the connection with the actuating-bars 14. When the header-frame is raised by the beam 16 to cut higher grain, the action of the arms 14 will be to push the links 13 forward, and as these links incline slightly backward when the reel and header-frame are at their lowest the pushing of these links forward also brings them into a more nearly vertical position, while the rear links 11 will move from their more nearly upright position to a more inclined or sloping position as they are pushed forward by reason of their connection with the bars 10. This action serves to raise the reel and to also thrust it forward, so that as the grain to be cut becomes higher the reel is correspondingly raised and at the same time thrown forward, so that with any grain it will be in position to sweep that grain back upon the cutters and sickle-bar and cause it to properly fall upon the draper.

The reel is rotated by any of the usual or well-known connections. In the present case I have shown a sprocket-wheel 19 upon the reel-shaft 9, and a chain 20 passes around this pulley to the pulleys 21 and 22. Power is transmitted to rotate the pulley 21 and drive the chain by means of a pulley 23, mounted upon the shaft 24, which also carries the pulley 21. Power is transmitted to the pulley 23 from any suitable part of the driving mechanism, this power being derived from the main bearing-wheels of the threshing-machine and transmitted in any usual or suitable manner. (Not here shown.)

Having thus described my invention, what I claim as new, and desire to secure by Letters Patent, is—

1. The combination with a header portion of a harvester mechanism of a reel, of a frame within which the reel is journaled and mechanism by which the reel is raised and advanced in unison with the raising of the header-frame, said mechanism including pivoted links at the rear end and between the front and rear ends of the reel-frame and means for operating the links.

2. In combination with a header, of a reel adapted to sweep the standing grain toward the sickle, a reel-frame, pivoted links connecting the frame with the header, and means connecting the links and having a fixed fulcrum whereby the raising and lowering of the header acts to raise and advance or lower and retract the reel in unison.

3. The combination with the header portion of a harvesting apparatus, and means by which the sickle-bar thereof is raised or depressed, of a reel adapted to sweep the grain toward the sickle-bar, reel-timbers to the front end of which the reel-shaft is journaled, links supporting said reel-timbers at the rear and at points intermediate between the rear and front ends, and bars having their rear ends fulcrumed upon the stationary part, their front ends connected with the forward supporting-links of the reel-frame.

4. The combination with a header adapted to be raised and lowered to suit different heights of grain, of a reel, rearwardly-extending timbers in the front end of which the reel-shaft is journaled, links pivoted to the header-frame extending upwardly and having the reel-frame timbers pivoted thereto, bars having their rear ends pivoted to the header-frame support and the front end connected with a pair of the reel-frame-supporting links whereby the reel is thrown upward and forward with the raising of the header-frame, and downward and backward when it is lowered.

5. In combination with a header-frame adapted to be raised and lowered, of a reel, rearwardly-extending frame-timbers in the front of which said reel is journaled, links pivoted to the header-frame timbers in pairs, one pair being pivotally and adjustably connected with the rear of the reel-frame, and the other pair pivotally and adjustably connected with the reel-frame intermediate between its front and rear ends, bars fulcrumed at one end to the header-frame and having the other ends connected with one pair of the reel-frame, supporting-links whereby the latter are tilted about their pivot-points and move the reel-frame upward and forward, or downward and backward in unison with the movements of the header-frame.

In witness whereof I have hereunto set my hand.

SHADRACH M. WARDER.

Witnesses:
S. H. NOURSE,
JESSIE C. BRODIE.